(12) United States Patent
Takahashi

(10) Patent No.: US 8,670,163 B2
(45) Date of Patent: Mar. 11, 2014

(54) IMAGE READER AND IMAGE FORMING APPARATUS USING SAME USING MULTIPLE IMAGE SENSORS AND WHICH CORRECTS MISALIGNMENT

(75) Inventor: Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 136 days.

(21) Appl. No.: 13/115,646

(22) Filed: May 25, 2011

(65) Prior Publication Data

US 2011/0292469 A1 Dec. 1, 2011

(30) Foreign Application Priority Data

May 25, 2010 (JP) .................................. 2010-119933
May 18, 2011 (JP) .................................. 2011-110972

(51) Int. Cl.
*H04N 1/04* (2006.01)
(52) U.S. Cl.
USPC ........... 358/474; 358/486; 358/497; 358/496; 358/498; 358/488
(58) Field of Classification Search
None
See application file for complete search history.

(56) References Cited

U.S. PATENT DOCUMENTS

| | | | | |
|---|---|---|---|---|
| 6,064,779 | A * | 5/2000 | Neukermans et al. | 382/313 |
| 2006/0050951 | A1* | 3/2006 | Iwasaki | 382/151 |
| 2008/0131168 | A1* | 6/2008 | Ehara et al. | 399/167 |

FOREIGN PATENT DOCUMENTS

| | | |
|---|---|---|
| CN | 101316307 A | 12/2008 |
| CN | 101540813 A | 9/2009 |
| CN | 101567956 A | 10/2009 |
| JP | 10-194481 | 7/1998 |
| JP | 2002-152465 | 5/2002 |
| JP | 2006-109406 | 4/2006 |

OTHER PUBLICATIONS

Combined Chinese Office Action and Search Report issued Jun. 5, 2013, in Chinese Patent Application No. 201110137518.6 with English translation of category of cited documents.

* cited by examiner

*Primary Examiner* — Mark K Zimmerman
*Assistant Examiner* — Helen Q Zong
(74) *Attorney, Agent, or Firm* — Oblon, Spivak, McClelland, Maier & Neustadt, L.L.P.

(57) ABSTRACT

An image reader includes an original transport device to transport an original, and an image reading device including multiple image sensor arrays having image reading areas staggered relative to the transport direction of the original in such a manner that the multiple image sensor arrays are offset at least partially, in the main scanning direction of the original with a predetermined gap therebetween in the transport direction. There is at least one original transport speed detector to detect the transport speed of the original transported by the original transport device, a storing device to store a reference delay time period which is between when the image sensor arrays on the upstream side read a predetermined position relative to the transport direction and when the image sensor arrays on the downstream side read the predetermined position. Further, there is a misalignment amount calculator, and an image synthesizer to synthesize an image read by the image sensor arrays.

6 Claims, 10 Drawing Sheets

ORIGINAL G (PART)

SYNTHESIZED PORTION

FIG. 7
(a) IDEAL TRANSPORT SPEED
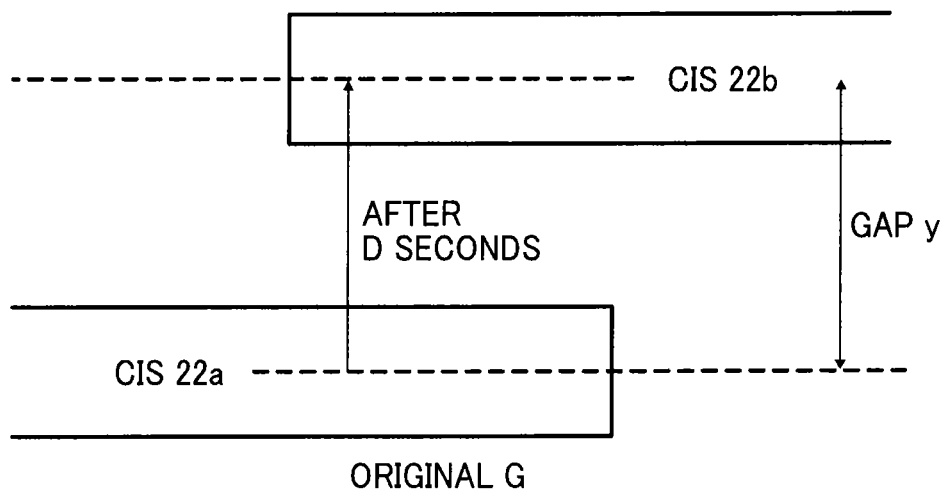
(b) NOT IDEAL TRANSPORT SPEED
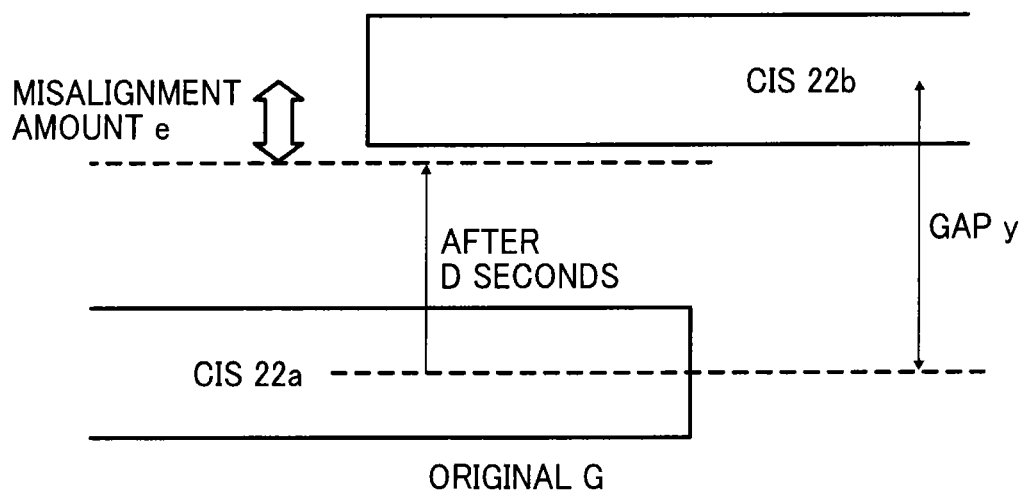

IMAGE READER AND IMAGE FORMING APPARATUS USING SAME USING MULTIPLE IMAGE SENSORS AND WHICH CORRECTS MISALIGNMENT

BACKGROUND OF THE INVENTION

1. Field of the Invention

The present invention relates to an image reader and an image forming apparatus using the image reader.

2. Description of the Background

Image readers such as scanners, photocopiers, and multi-functional machines may be constructed to read large-size originals such as A0 sheets. A0 paper is paper having a height of 1189 mm and a width of 841 mm. These image readers may be implemented using contact image sensors (hereinafter "CIS" or simply "sensors") to read images of originals transported by transport rollers. In order to reduce cost, the image readers may use a plurality of staggered, partially overlapping sensors to read small-size originals such as A3 and A4, in addition to large-size sheets such as A0.

In image readers equipped with a sensor portion having multiple staggered sensors, the image data read by the multiple image sensors must be suitably synthesized to align the image data as if it were read by a single sensor. Such image readers align image data in the main scanning direction by adjusting the reading range of each sensor and in the sub-scanning direction by adjusting the delay time of delay memories provided at each of the sensors based on the arranged distance (gap) between sensors and the transport speed in the sub-scanning direction.

With regard to the delay time adjustment in the sub-scanning direction, a dedicated chart or calibration image on which multiple parallel reference lines in the main scanning direction are recorded along the sub-scanning direction is typically used. The multiple CISs of the sensor portion read the dedicated chart as the original is being transported by transport rollers. Thereafter, the delay time for starting reading images from memories is adjusted by observation of the images where the parallel reference lines are aligned by sight.

However, the actual transport speed of an original is not constant but varies due to eccentricity, deflection, etc., of the transport rollers, non-uniform rotation of the driving motor, friction resistance of parts, etc. As a result, the transport speed changes depending on the position of the dedicated chart in the transport direction. Therefore, a misalignment amount of the parallel reference lines read by the sensors changes so that adjusting the delay time based on the misalignment amount at a single position of the parallel reference lines may conversely result in an increase of misalignment amount at other positions.

However, during transportation of an original, for example, when the front end of the original enters into rollers 13 of FIG. 2 or the rear end of the original passes through rollers 11, physical contact and separation between the original and the rollers may cause vibration referred to as shock jitter.

The original vibrates due to the shock jitter, which leads to changes in the transport speed of the original.

Since the shock jitter suddenly occurs and dies down soon, the transport speed temporarily fluctuates, thereby affecting alignment (synthesis) of images but thereafter the affection dies down.

FIG. 1(*a*) is a diagram illustrating an original and FIG. 1(*b*) is a diagram illustrating the result of an aligned image of a read original G with no correction when shock jitter occurs the distance of −1 dot apart between the image sensor arrays. FIG. 1(*c*) is a diagram illustrating the result of the aligned image of the read original G under the same condition of the aligned image shown in FIG. 1(*b*) with correction according to Japanese patent application publication no. (hereinafter referred to as JP-A) 2006-109406.

Alignment is not suitably corrected by using the average described in JP-2006-109406-A in the case shown in FIGS. 1(*b*) and 1(*c*).

SUMMARY OF THE INVENTION

For these reasons, the present inventors recognize that a need exists for an image reader that improves the alignment of images read by multiple image sensor arrays to ameliorate the quality of an image formed by aligning (synthesizing) the images.

Accordingly, an object of the present invention is to provide an image reader that improves the alignment of images read by multiple image sensor arrays to ameliorate the quality of an image formed by aligning (synthesizing) the images.

Briefly, this object and other objects of the present invention as hereinafter described will become more readily apparent and can be attained, either individually or in combination thereof, by an image reader including an original transport device to transport an original, an image reading device including multiple image sensor arrays sensing discrete ranges and staggered on the upstream side and the downstream side relative to the transport direction of the original in such a manner that the multiple image sensor arrays are mutually offset at least partially in the main scanning direction of the original with a predetermined gap between adjacent sensors in the transport direction while adjacent image sensor arrays overlap by a predetermined amount, at least one original transport speed detector to detect a transport speed of the original transported by the original transport device, a storing device to store a reference delay time period extending from when the image sensor arrays on the upstream side read a predetermined position relative to the transport direction to when the image sensor arrays on the downstream side read the same predetermined position, a misalignment amount calculator to calculate a misalignment amount between a position in the original relative to the transport direction read by the image sensor arrays on the upstream side at a given time and a position of the original relative to the transport direction read by the image sensor arrays on the downstream side in the reference delay time period after the given time based on the transport speed output by the original transport speed detector during the reference delay time period after the given time and a predetermined original reference transport speed while the original is being transported, and an image synthesizer to synthesize an image read by the image sensor arrays on the upstream side and an image read by the image sensor arrays on the downstream side based on the maximum misalignment amount and the minimum misalignment amount calculated by the misalignment amount calculator and an intermediate value intermediate between the maximum misalignment amount and the minimum misalignment amount.

It is preferred that, in the image reader mentioned above, the original transport speed detector is provided around at least one end of the adjacent image sensor arrays provided on the upstream side and the downstream side.

It is still further preferred that, in the image reader mentioned above, multiple original transport speed detectors are provided around the overlapping adjacent ends of the image sensor arrays on the upstream side, the misalignment amount calculator calculates the misalignment amount at all the overlapping adjacent ends based on readings from the multiple transport speed detectors, and the image synthesizer synthesizes the image read on the upstream side and the image read on the downstream side for all of the overlapping adjacent ends.

As another aspect of the present invention, an image forming apparatus is provided which includes the image reader mentioned above and an image forming unit to form an image of an original on a recording medium based on image data read by the image reader.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 7(a) is a diagram illustrating a case in which the original transport speed is the reference transport speed and FIG. 7(b) is a diagram illustrating a case in which the original transport speed is not equal to the reference transport speed;

DETAILED DESCRIPTION OF THE INVENTION

The present disclosure will be described below in detail with reference to several embodiments and accompanying drawings.

First Embodiment

Figure 2:
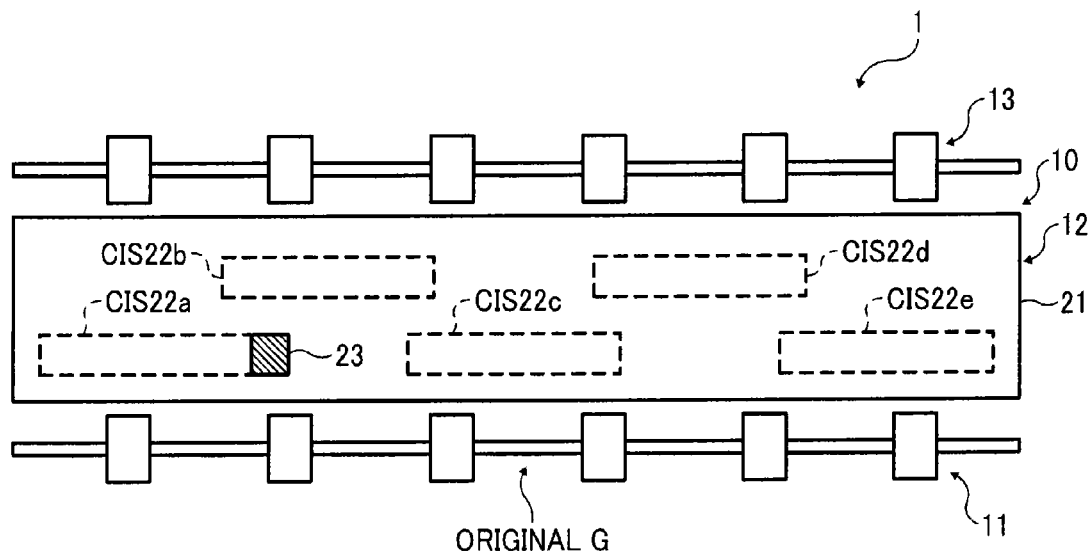
FIG. 2 is a top view illustrating an image reading portion of an image reader having a structure of a first embodiment.

In FIG. 2, the image reader 1 includes the image reading portion 10, an original table where an original to be read is placed. The image reader 1 may use a feeding roller that separates the originals placed on the original table one by one and feeds it to the image reading portion 10. After scanning, the original is sent to a discharging tray. The image reader and image forming apparatus utilize=an operation display. The image reader 1 is applicable not only to a dedicated image reader such as a scanner but also to an image forming apparatus such as a photocopier and a multi-functional apparatus that includes the image reading portion 10.

The operation display (selection device) includes various kinds of keys necessary to provide instructions for the image reader 1 and lamps such as display (e.g., liquid display) or LED (light emitting diode). From the operation keys, operations required to read originals using the image reader 1 are instructed in order to read an original and the mode is selected for the misalignment adjustment function.

On the display, instructions input from the operation keys and various kinds of information of which the image reader 1 notifies a user are displayed. The invention may be implemented using the multi-function apparatus and/or scanner disclosed in U.S. Pat. Nos. 5,878,319 or 7,782,498, both of which are incorporated by reference.

Figure 3:
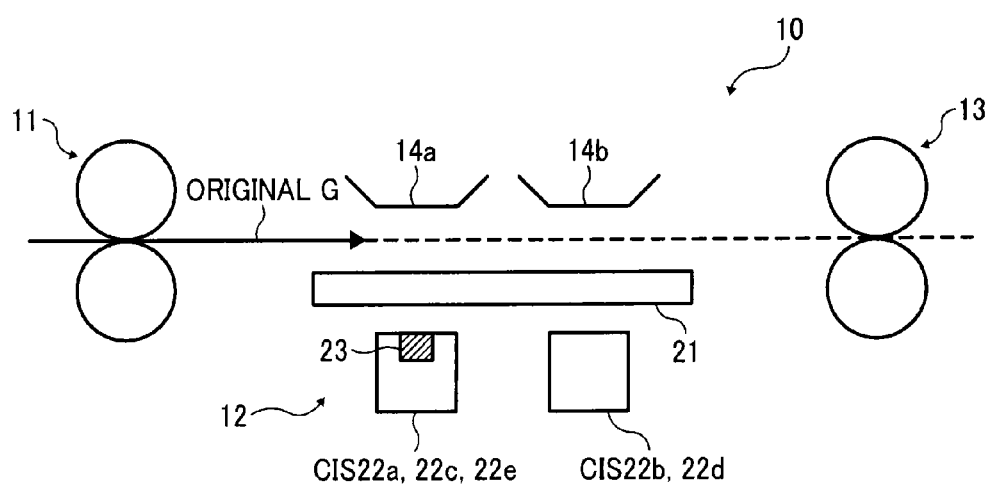
FIG. 3 a side view illustrating the image reading portion of FIG. 2.

As illustrated in FIGS. 2 and 3, a pair of pre-rollers 11, a sensor portion 12, and a pair of post-rollers 13 are arranged in the image reading portion 10 from the upstream to the down stream relative to the transfer direction (sub-scanning direction) of the original G. A pressing board 14a and a pressing board 14b are provided above the sensor portion 12.

The originals G set on the original table are separated and fed one by one from the original table. The sensor portion (image reading device) 12 are longer in the main scanning direction (e.g., the width of the sensor portion 12 which is perpendicular to the direction of travel of the original which is the sub-scanning direction) than the reading size of the maximum value original width. A contact glass 21 is provided on the top portion of the chassis of the sensor having a predetermined width in the sub-scanning direction. In the chassis of the sensor, multiple image sensor arrays (CIS), five in the first embodiment, CIS 22a, CIS 22b, CIS 22c, CIS 22d, and CIS 22e are staggered along the sub-scanning direction in such a manner that the CIS 22a, the CIS 22c, and CIS 22e are located on the upstream side of the CIS 22b and the CIS 22d relative to the sub-scanning direction a predetermined distance apart from each other with ends of the original reading areas of the CIS overlapped by a predetermined amount. That is, as illustrated in FIG. 2, the CIS 22a and CIS 22e at the edges of the sensor portion 12 and the CIS 22c at the center the sensor portion 12 are situated on the upstream side of the CIS 22b and the CIS 22d relative to the transfer direction of the original G. The CIS 22b and the CIS 22d are located between the CIS 22a, CIS 22c, and CIS 22e provided on the upstream side in the sub-scanning direction. Both ends of each of the CIS 22b and the CIS 22d are overlapped with ends of the CIS 22a, CIS 22c, and CIS 22e by a predetermined length along the main scanning direction.

Each of CIS 22a to CIS 22e has a light source, a lens, and an image sensor array in which image sensors such as CMOSs (Complementary Metal Oxide Semiconductors) and CCDs (Charge Coupled Devices) are arranged in an array.

In addition, the sensor portion 12 includes a speed sensor 23 in the vicinity of the end of the CIS 22a closer to the CIS 22c. The speed sensor (original transfer speed detection device) 23 is arranged in parallel with the CIS 22a and detects the transfer speed of the original G while it is being transferred on the contact glass 21. A contact type speed sensor that detects the transfer speed of the original G by making contact with the original G or a non-contact type speed sensor (for example, a doppler sensor described in JP-H08-107472-A) can be suitably used) that detect the transfer speed of the original G by using ultrasonic detection or light without touching the original G can be used as the speed sensor 23.

That is, the sensor portion 23 is provided in the vicinity of the end of the CIS 22a on the upstream side of the sensor portion 12 which overlaps with the end of the CIS 22b on the downstream side of the sensor portion 12 and detects the transfer speed of the portion of the original G which passes the overlapped portion.

The pressing board 14a has a predetermined width in the sub-scanning direction and is provided above the CIS 22a, the CIS 22c, and the CIS 22e over a length longer in the main scanning direction than the maximum value original width and arranged a predetermined distance apart from the contact glass 21. The pressing board 14b has a predetermined width in the sub-scanning direction and is provided above the CIS 22b and the CIS 22d over a length longer than the maximum value original width and arranged a predetermined distance apart from the contact glass 21. As an alternative to being a predetermined distance from the contact glass the pressing boards 14a and 14b can be movable and urged against or towards the contact glass 21 by a biasing device such as springs.

The pressing board 14a and the pressing board 14b press the original G against the contact glass 21 while the original G is transferred between the contact glass 21 and the pressing boards 104a and 104b. Moreover, the surfaces of the pressing board 104a and the pressing board 104b on the side of the CIS 22a to CIS 22e are white and provide white reference data for shading correction by which irradiation splash of the light source and non-uniformity of the sensitivity of the image sensor array are corrected.

The light source irradiates the pressing board 14a and the pressing board 14b with the reading light through the contact glass 21 and the reflection light is collected by the image sensor array via lenses and guided into the image sensor array where the incident light is subjected to photoelectric conversion to obtain the white reference data in the CIS 22a to CIS 22e.

In addition, the light source irradiates the original G transferred between the contact glass 21 and the pressing board 14a and the pressing board 14b with the reading light through the contact glass 21 when reading the original G and the reflection light is collected by the image sensor array via lenses and guided to the image sensor array where the incident light is subjected to photoelectric conversion to read the image of the original G.

The CIS 22a to CIS 22e are staggered as described above, are partially and mutually overlapped, and have overlapped image reading ranged in the main scanning direction. That is, the CIS 22a and the CIS 22b, the CIS 22b and the CIS 22c, the CIS 22c and the CIS 22d, and the CIS 22d and the CIS 22e have effective imaging ranges overlapped. The image reader 1 obtains an image with no misalignment in the main scanning direction by electrically synthesizing the image signals read at the alignment portion, which is the overlapped portion of the original image reading range. The pixel position at the alignment position of the CIS 22a to CIS 22e along the main scanning direction can be individually set by each of the CIS 22a to CIS 22e so that the alignment position of the image can be adjusted.

Since the CIS 22a, CIS 22c, and CIS 22e on the upstream side and the CIS 22b and CIS 22d on the downstream side are arranged with a predetermined gap therebetween in the transfer direction (sub-scanning direction) of the original G in the image reader 1, the image data output by the image sensor arrays of the CIS 22a, CIS 22c, and CIS 22e on the upstream side relative to the sub-scanning direction are saved temporarily in memories 41a, 41c, and 41e (refer to FIG. 4) and read from the memories after a predetermined delay time. Thereafter, the image data are synthesized with the image data of the image sensor arrays of the CIS 22b and CIS 22d on the downstream side relative to the sub-scanning direction to obtain the aligned image in the main scanning direction. By aligning the images in the main scanning direction and the sub-scanning direction as described above, the image obtained by the staggered five image sensor arrays in the image reader 1 is as if it were obtained by a single image sensor.

Figure 4:
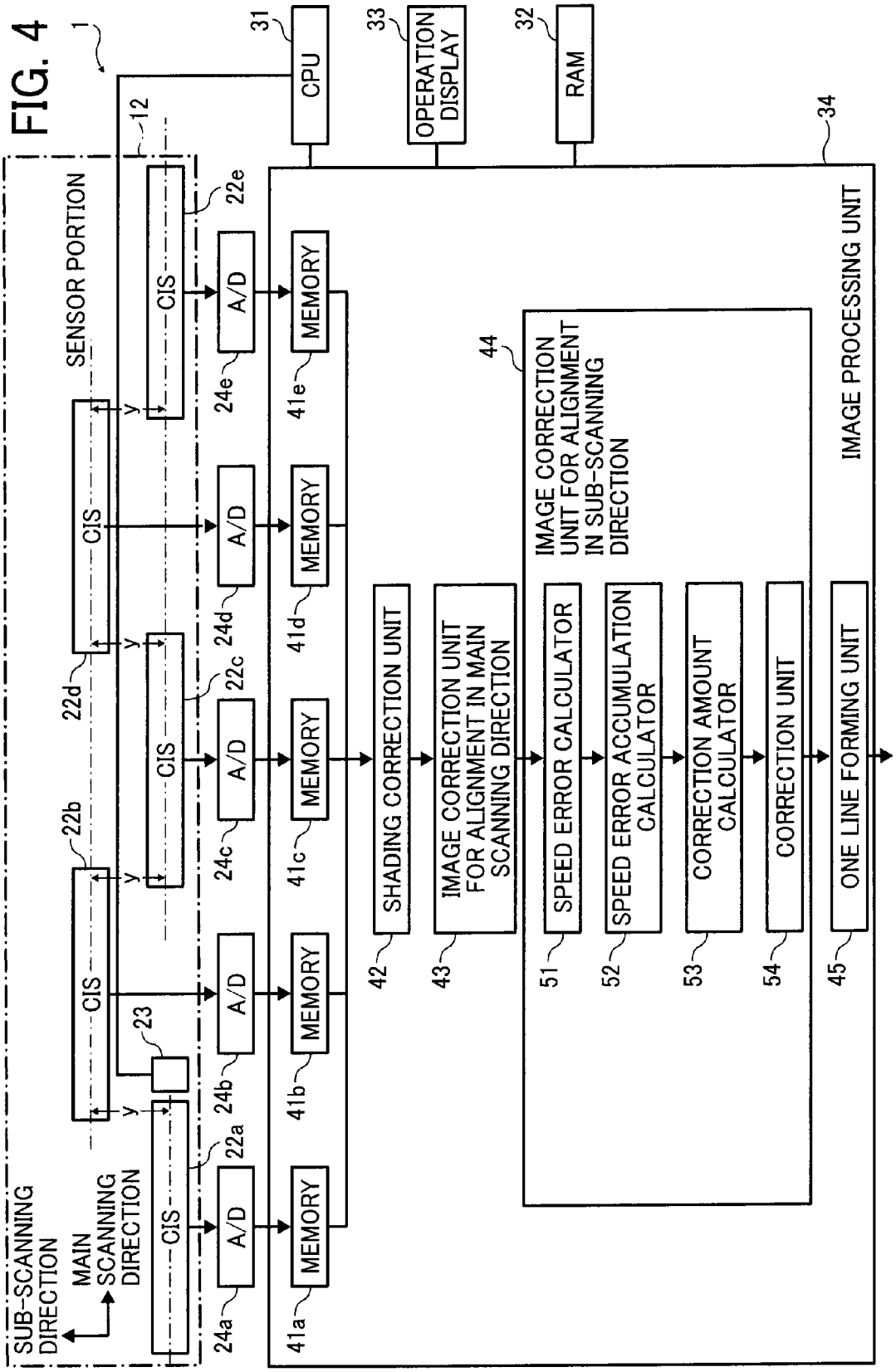
FIG. 4 is a block diagram of the main portion of the image reader.
Figure 5:
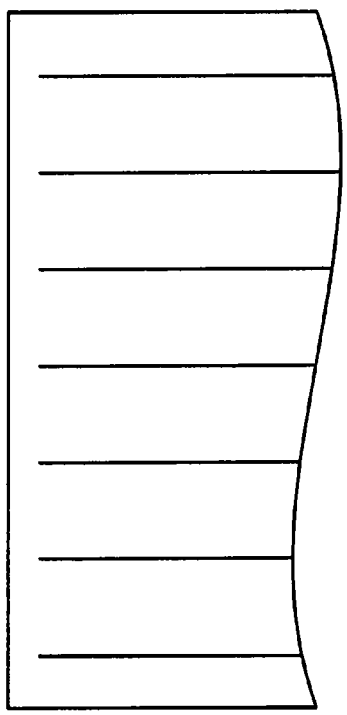
FIG. 5 is a diagram illustrating an example of an original.

The image reader 1 has a block diagram structure as illustrated in FIG. 4, which includes the sensor portion 12, a central processing unit (CPU) 31, a random access memory (RAM) 32, the operation display 33, an image processor 34, etc.

In the sensor portion 12 of FIG. 4, A/D (analog/digital) converters 24a to 24e are connected with each of the CIS 22a to CIS 22e via an AC coupling condenser C. The A/D converters 24a to 24e output image signals output from the corresponding CIS 22a to CIS 22e to the image processor 34 after digital conversion.

The CPU 31 receives operation instructions from the operation display 33, outputs data to the operation display 33 in order to display the data to the user, and controls data related to the sensor portion 12, the image processing unit 34 (also referred to as the image processor), and the RAM 32. The RAM 32 stores the reference delay time D to synthesize the image data output from each of the CIS 22a to CIS 22e in the sub-scanning direction, a target transfer speed v, and the total reference number of pixels in the main scanning direction obtained from the adjacent CIS 22a to CIS 22e required to accurately align the image in the main scanning direction.

For example, the intended reference delay time D (seconds or s), the distance (hereinafter referred to as arranged distance or CIS distance) y (mm) between the CIS 22a, CIS 22c, and CIS 22e on the upstream side and the CIS 22b and CIS 22d on the downstream-side, and the intended original reference transfer speed v (mm/s) satisfy the following relationship: $D=y/v$. Data regarding the CIS distance y, the original reference transfer speed v, and the reference delay time D are stored in the RAM 32.

As described above, the sensor portion 12 includes the five CIS 22a to CIS 22e and their corresponding A/D converters 24a to 24e where analog data output by the image sensor arrays of the CIS 22a to CIS 22e are digital-converted. The digital-converted data are output to the image processor 34.

The image processor 34 includes memories 41a to 41e, a shading correction unit 42, an image correction unit 43 for alignment in the main scanning direction, an image correction unit 44 for alignment in the sub-scanning direction, and a one-line forming unit 45. The image correction unit 44 for alignment in the sub-scanning direction includes a speed error calculator 51, a speed error accumulation calculator 52, a correction amount calculator 53, and a correction unit 54.

The image processor 34 stores the digital-converted image data from the sensor portion 12 in the memories 41a to 41e. The shading correction unit 42 conducts shading correction for the image data accumulated in the memories 41a to 41e based on the white reference data obtained from the pressing board 14a and the pressing board 14b before reading an original and outputs the data to the image correction unit 43 for alignment in the main scanning direction.

The image correction unit 43 for alignment in the main scanning direction produces an image free from misalignment in the main scanning direction by electrically synthesizing the image data read at the alignment positions of the CIS 22a and the CIS 22b, the CIS 22b and the CIS 22c, the CIS 22c and the CIS 22d, and the CIS 22d and the CIS 22e for the image data obtained after the shading correction and outputs them to the image correction unit 44 for alignment in the sub-scanning direction.

The image correction unit 44 for alignment in the sub-scanning direction corrects the misalignment of the image data read by the CIS 22a, CIS 22c, and CIS 22e on the upstream side and the image data read by the CIS 22b and CIS 22d on the downstream side in the sub-scanning direction and outputs the corrected image data to the one-line forming unit 45. The one-line forming unit 45 forms a single line from the image data which have been corrected in the sub-scanning direction and outputs the single line image as the read image data.

In the image correction unit 44 for alignment in the sub-scanning direction, the speed data (actual original transfer speed) V measured at any given time is input from the speed sensor 23 to the speed error calculator 51. The speed error calculator 51 calculates the speed error based on the difference between the actual original transfer speed V and the original reference transfer speed v saved in the RAM 32 and outputs it to the speed error accumulation calculator 52. The speed error accumulation calculator (misalignment amount calculator) 52 calculates the speed error accumulated value obtained by accumulating the speed error obtained at the time described above for the period of time corresponding to the reference delay time D saved in the RAM 32 in the sub-scanning direction for ×n given times and outputs the result to the correction amount calculator 53.

The correction amount calculator 53 calculates the maximum value Emax, the minimum value Emin, and their intermediate value Emid from the n speed error accumulation values calculated by the speed error accumulation calculator 52, obtains a correction amount M (as explained below) based on these maximum value Emax, the minimum value Emin, and their intermediate value Emid, and outputs it to the correction unit 54.

The correction unit 54 generates image data as if the image were read by a single image sensor array by synthesizing the image data of the CIS 22a, CIS 22c, and CIS 22e on the upstream side which are accumulated in the memories 41a, 41c, and 41e with the image data of the CIS 22b and CIS 22d on the downstream side which are accumulated in the memories 41b and 41d at the one-line forming unit 45 by delaying the image data accumulated in the memories 41a, 41c, and 41e that accumulate the image data of the CIS 22a, CIS 22c, and CIS 22e on the upstream side against the memories 41b and 41d that accumulate the image data of the CIS 22b and CIS 22d on the downstream side with a delay time to (described below) after correction which is obtained by correcting the reference delay time D saved in the RAM 32 based on a correction delay time tx (described below) corresponding to the correction amount M. The correction amount calculator 53 and the correction unit 54 serve as an image synthesizer.

Next, the function of this embodiment is described. The image reader 1 of this embodiment determines the correction amount of the reading delay time of the read image data of the CIS 22a, CIS 22c, and CIS 22e on the upstream side and the CIS 22b and CIS 22d on the downstream side staggered therewith based on the actual transfer speed of the original G detected by the speed sensor 23 and corrects the misalignment in the sub-scanning direction by reading the image data from the memories 41a to 41e according to the determined reading delay time.

That is, the image reader 1 transfers the original G set on the original table onto the contact glass 21 of the sensor portion 12 by the pair of pre-rollers 11 and the pair of post-rollers 13 when the original G is fed to the image reading portion 10, reads an image of the original G being transferred on the contact glass 21 by the CIS 22a, CIS 22c, and CIS 22e on the upstream side and the CIS 22b and CIS 22d on the downstream side of the sensor portion 12, and digital-converts the image signals of the original G read at each of the CIS 22a to CIS 22e by the A/D converter 24a to 24e to accumulate the digital-converted image in the memories 41a to 41e in the image processor 34.

The image processor 34 corrects shading of the image data of the memories 41a to 41e at the shading correction unit 42 to make image correction in the main scanning direction by the image correction unit 43 for alignment in the main scanning direction. Then, the image processor 34 performs image correction in the sub-scanning direction by the image correction unit 44 for alignment in the sub-scanning direction.

The image reader 1 of this embodiment calculates the delay correction time for the reference delay time D based on the speed error N obtained from the detection result of the speed sensor 23 and the original reference transfer speed v by reading a single original at multiple given timings in the image correction unit 44 for alignment in the sub-scanning direction. Then, the image reader 1 makes a misalignment adjustment at the alignment position in the sub-scanning direction by delaying the start of reading the image data on the memories 41a, 41c, and 41e illustrated in FIG. 4 on the upstream side relative to the image data on the memories 41b and 41d on the downstream side.

The case with the speed error N=f(t) and the case without the speed error are described in detail with reference to FIG. 7.

FIG. 7(a) and FIG. 7(b) are enlarged diagrams illustrating part of the diagram of FIG. 3.

CIS 22a and CIS 22b are physically distant with a gap y therebetween.

FIG. 7(a) is a diagram illustrating the case without the speed error.

In this case, CIS 22b reads the position D seconds after CIS 22a reads it at a certain point of time.

D represents the reference delay time obtained from the relationship: D=y/v.

FIG. 7(b) is a diagram illustrating the case with the speed error N=f(t).

In this case, the position is not read by the CIS 22b D seconds after CIS 22a reads it at a certain point of time.

The difference between the position read by CIS 22b t seconds after the CIS 22a and the position read by CIS 22a D seconds before CIS 22b (which is the position CIS 22b would read without the speed error) is the misalignment amount in the sub-scanning direction.

The calculation about the misalignment amount in the sub-scanning direction at D seconds after CIS 22a reads the position is based on the speed for t seconds detected by the speed sensor.

That is, for example, the misalignment amount e which occurs when an image read by CIS 22a at a certain point of time t1 and an image read by CIS 22b are synthesized for alignment without correction is calculated according to the relationship 1.

$$e1 = \int_{t1}^{t1+D} f(t) \qquad \text{Relationship 1}$$

To deal with the temporary misalignment caused by temporary speed change due to shock jitter, etc., the misalignment amount e is calculated at multiple points of time during transport of the original in this embodiment.

When the speed error N=f (t) is defined as in the relationship 1, the misalignment amount which occurs when the images read by CIS 22a at t1, t2, t3, t4, and t5 and images read by CIS 22b are synthesized for alignment without correction is represented by the relationship 2.

$$e1 = \int_{t1}^{t1+D} f(t), e2 = \int_{t2}^{t2+D} f(t),$$
$$e3 = \int_{t3}^{t3+D} f(t), e4 = \int_{t4}^{t4+D} f(t),$$
$$e5 = \int_{t5}^{t5+D} f(t),$$

Relationship 2

However, as the number of multiple points of time increases, the calculation becomes more complex. Therefore, it is suitable to determine the number of multiple points of time considering the balance between the capacity of memory and the desired accuracy.

The speed error accumulation calculator 52 calculates the speed error between the original reference transfer speed v and the actual original transfer speed V detected by the speed sensor 23 at predetermined timings, outputs the calculation result to the correction amount calculator 53. The correction amount calculator 53 calculates the maximum Emax, the minimum Emin, and the middle Emid from n speed error accumulation values calculated by the speed error accumulation calculator 52 and obtains the correction amount M from the these results.

$$M=(Emax+Emin)/2$$

Relationship 3

The correction amount M is the middle misalignment amount Emid, which is the middle of the maximum misalignment amount Emax and the minimum misalignment amount Emin.

The correction amount calculator 53 calculated the correction delay time tx corresponding to the correction amount M by dividing the correction amount M with the original reference transfer speed v as shown in the relationship 4.

$$tx=M/v$$

Relationship 4

In this case, the delay time ta after correction is obtained by subtracting the correction delay time tx (=M/v) from the reference delay time D.

The correction unit 54 makes correction at the connection point in the sub-scanning direction by delaying reading the image data of the memories 41a, 41c, and 41e on the upstream side based on the delay time ta after correction calculated by the correction amount calculator 53 against reading the image data of the memories 41b and 41d on the downstream side.

Figure 8:
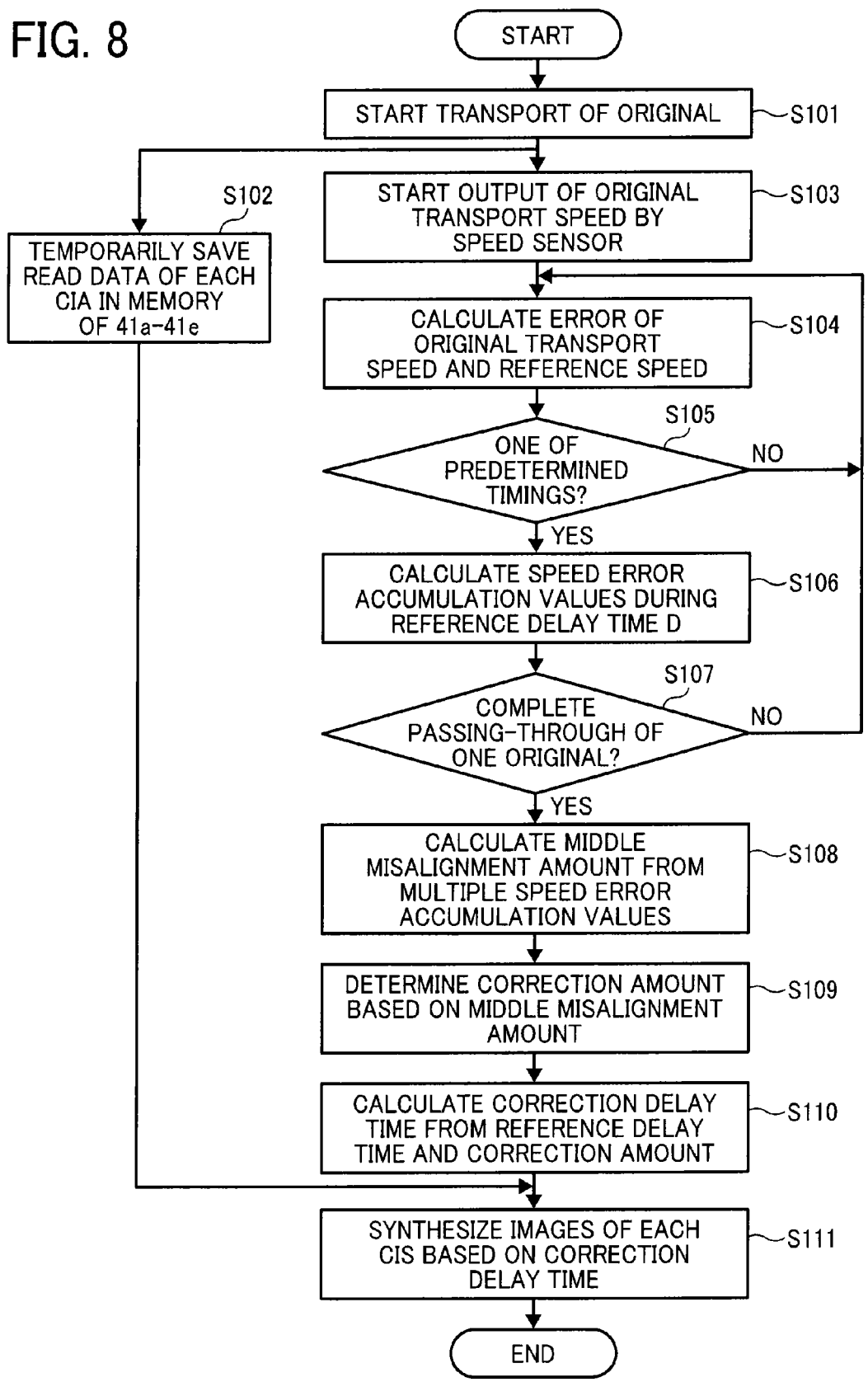
FIG. 8 is a flow chart illustrating bridging correction processing in the sub-scanning direction of first embodiment described later.

Next, the flow of process is described with reference to the flowchart shown in FIG. 8.

The speed sensor 23 starts output of the transport speed in parallel with reading the original (step S103).

The image correction unit at alignment position continuously calculates the speed error from the input from the speed sensor by the speed error calculator 51 (step S104).

Determine whether it is one of the predetermined multiple timings (step S105) and if the answer is yes, calculate the accumulated speed error by accumulating the speed error from the timing for the reference delay time D (step S106).

The processing from steps S104 to S106 are repeated until the entire of the original is read (step S107).

Therefore, the accumulated speed error is calculated at the multiple timings.

Calculate the middle value of the misalignment amount from the maximum and minimum of the multiple accumulated speed errors obtained at the multiple timings (step S108).

Calculate the correction amount M from the middle value (step S109).

Furthermore, the correction amount calculator 53 calculates the correction delay time to based on the correction amount M, the reference delay time D, and the original reference transport speed v (step S110).

The correction unit 54 makes correction at the synthesized point in the sub-scanning direction by delaying reading the image data of the memories 41a, 41c, and 41e on the upstream side based on the delay time to after correction calculated by the correction amount calculator 53 against reading the image data of the memories 41b and 41d on the downstream side (step S111).

Figure 1:
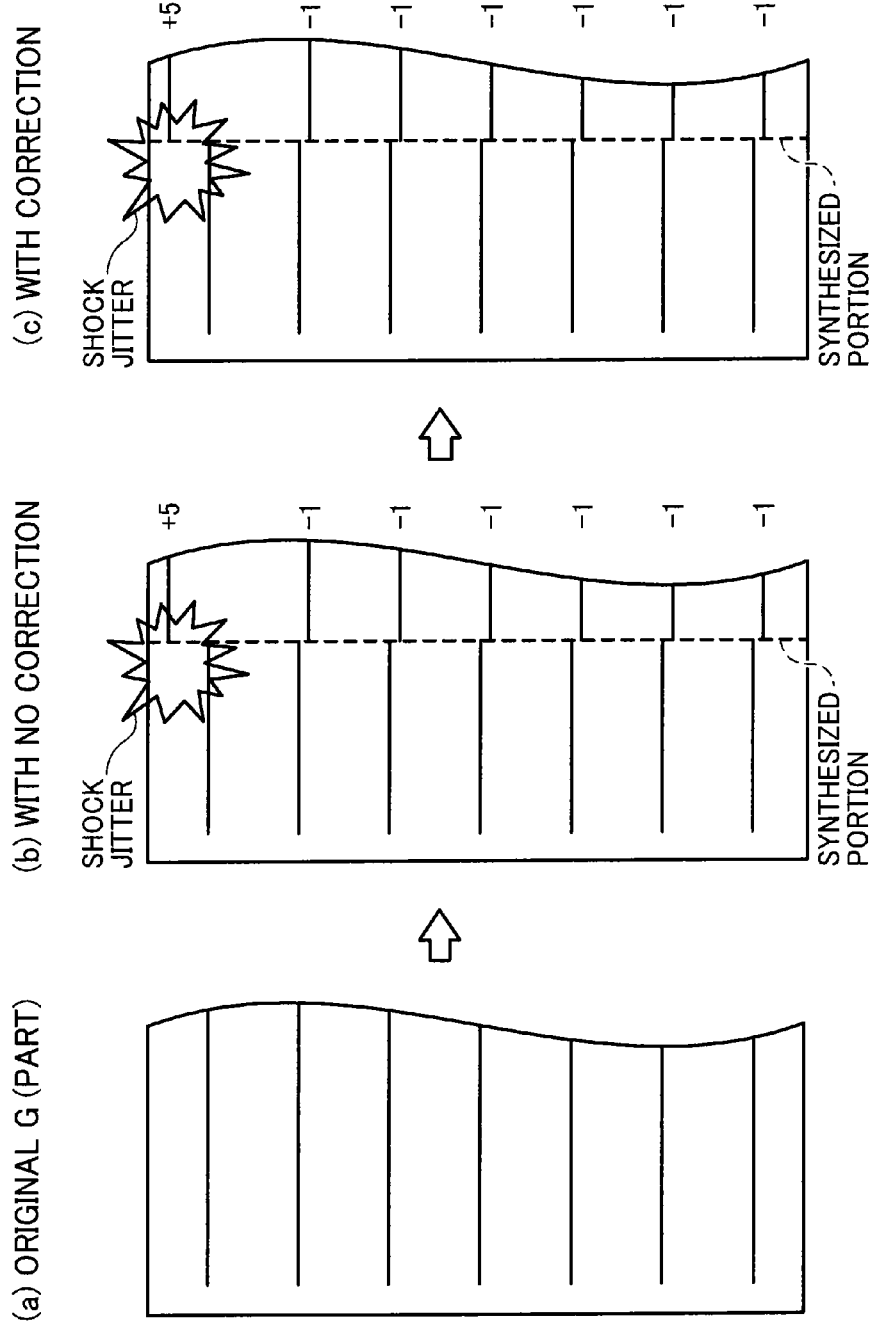
FIG. 1(a) is a diagram illustrating an original.
FIG. 1(b) is a diagram illustrating the result of an aligned image of a read original G with no correction when shock jitter occurs the distance of −1 dot apart between the image sensor arrays.
FIG. 1(c) is a diagram illustrating the result of the aligned image of the read original G under the same condition of the aligned image shown in FIG. 1(b) with correction according to Japanese patent application publication no. (hereinafter referred to as JP-A) 2006-109406.
Figure 6:
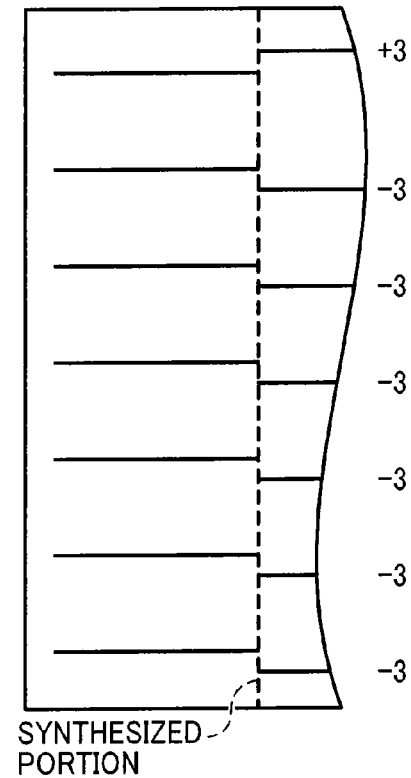
FIG. 6 is a diagram illustrating an example of an image after alignment of images in the sub-scanning direction.

By adjusting the alignment position in the sub-scanning direction as described above, for example, the image read when a shock jitter occurs as illustrated in FIG. 1 can be corrected to a degree that the misalignment is unrecognizable to human eyes as illustrated in FIG. 6.

In the image reader 1 of this embodiment, the speed sensor 23 detects the transport speed of the original G being transported at the reading position of the image sensor arrays of CIS 22a to CIS 22e that reads images of the original in their discrete ranges and are staggered on the upstream side and the downstream side relative to the transport direction of the original in such a manner that the multiple CISs are mutually offset at least partially in the main scanning direction of the original with the predetermined arranged distance y between adjacent sensors in the transport direction while adjacent image sensor arrays overlap by a predetermined amount. Based on the difference between the reference transport speed v and the actual transport speed detected by the speed sensor 23, the misalignment amount from the predetermined arranged distance y is obtained by the positional difference relative to the transport direction of the original G between the position read by the image sensor arrays (CIS 22a, CIS 22c, and CIS 22e) on the upstream side at a given time and the position read by the image sensor arrays (CIS 22b and CIS 22d) on the downstream side in the reference delay time period after the given time. This misalignment amount is calculated multiple times at given times. The image reader 1 synthesizes the image read on the upstream side and the image read on the downstream side based on the arranged distance y and the maximum misalignment amount Emax, the minimum misalignment amount Emin, and the intermediate misalignment amount of the maximum misalignment amount Emax and the minimum misalignment amount Emin among the multiple misalignment amounts.

Therefore, for example, misalignment can be corrected simply and precisely in a short time without the need to use the dedicated chart Ct or human labor, if desired, for example, every time the original G is read, so that the availability of the image reader 1 and the image quality can be improved.

In addition, since the dedicated chart Ct is not required, misalignment of the target original G can be suitably corrected to improve the image quality of the read image even when the original G having different conditions from the dedicated chart Ct with regard to thickness, type, size, etc. is read.

Furthermore, since the image reader 1 of this embodiment determines misalignment amount in the sub-scanning direction based on the original transfer speed error accumulation values of (Emax−Emid) obtained multiple times in the sub-scanning direction, the absolute value of the misalignment amount in the sub-scanning direction after adjustment can be minimized even if an abrupt misalignment is caused by shock jitter, etc. Therefore, the amount of recognition of defective images is improved, which leads to improvement of the image quality.

The image reader 1 of this embodiment synthesizes the image read by the image sensor array on the upstream side with the other image read by the image sensor array on the downstream side based on the half value Esmid of the difference between the maximum misalignment amount Emax and the minimum misalignment Emin and the arranged distance y.

Therefore, the misalignment can be more accurately adjusted to further improve the image quality. Furthermore, in the image reader 1 of this embodiment, the speed sensor 23 is provided close to the alignment positions of the CIS 22a to CIS 22e to detect the transfer speed of an original. Therefore, the transfer speed of the original G at the alignment position can be highly accurately detected so that the misalignment can be furthermore accurately adjusted.

Second Embodiment

Figure 9:
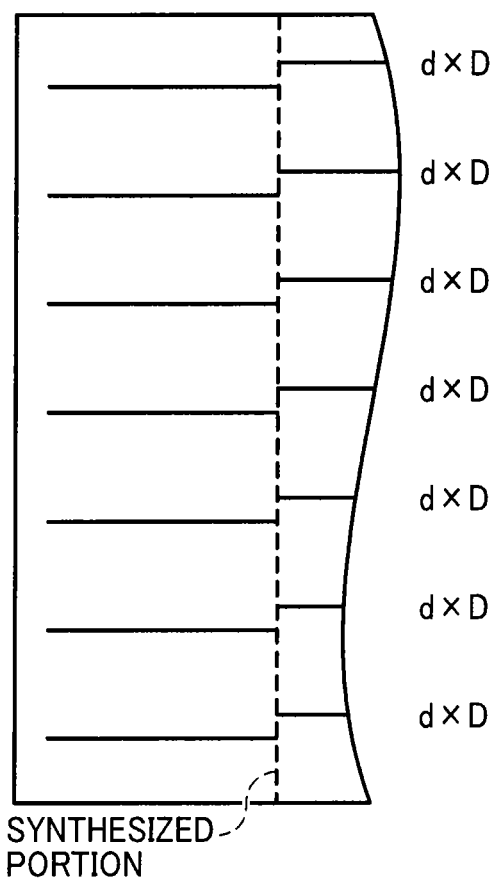
FIG. 9 is a diagram illustrating an example of the results of reading a dedicated chart or calibration image when the original transfer speed error is constant.
Figure 10A:
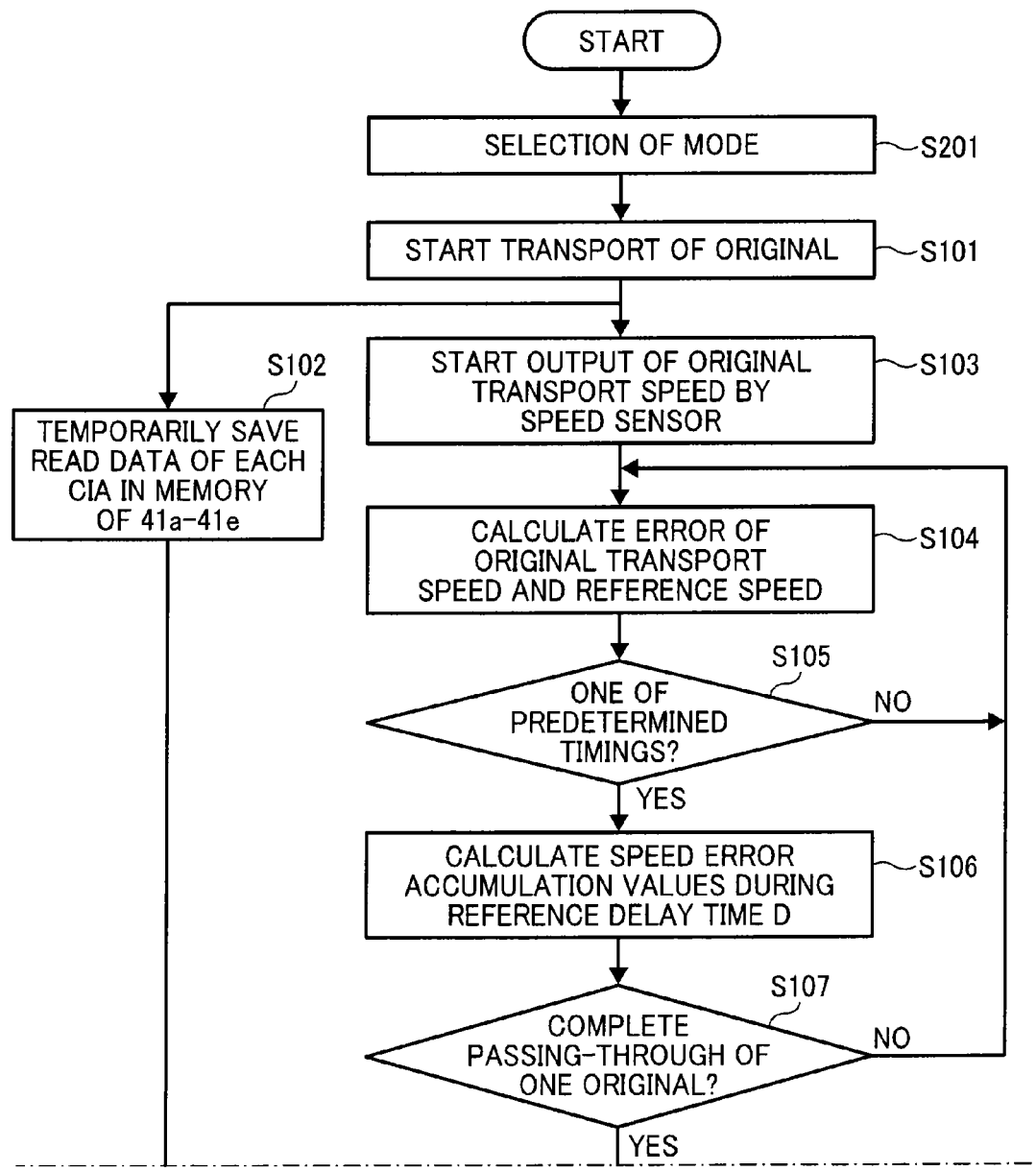
FIG. 10 is a flowchart illustrating bridging correction processing in the sub-scanning direction of the second embodiment.
Figure 10B:
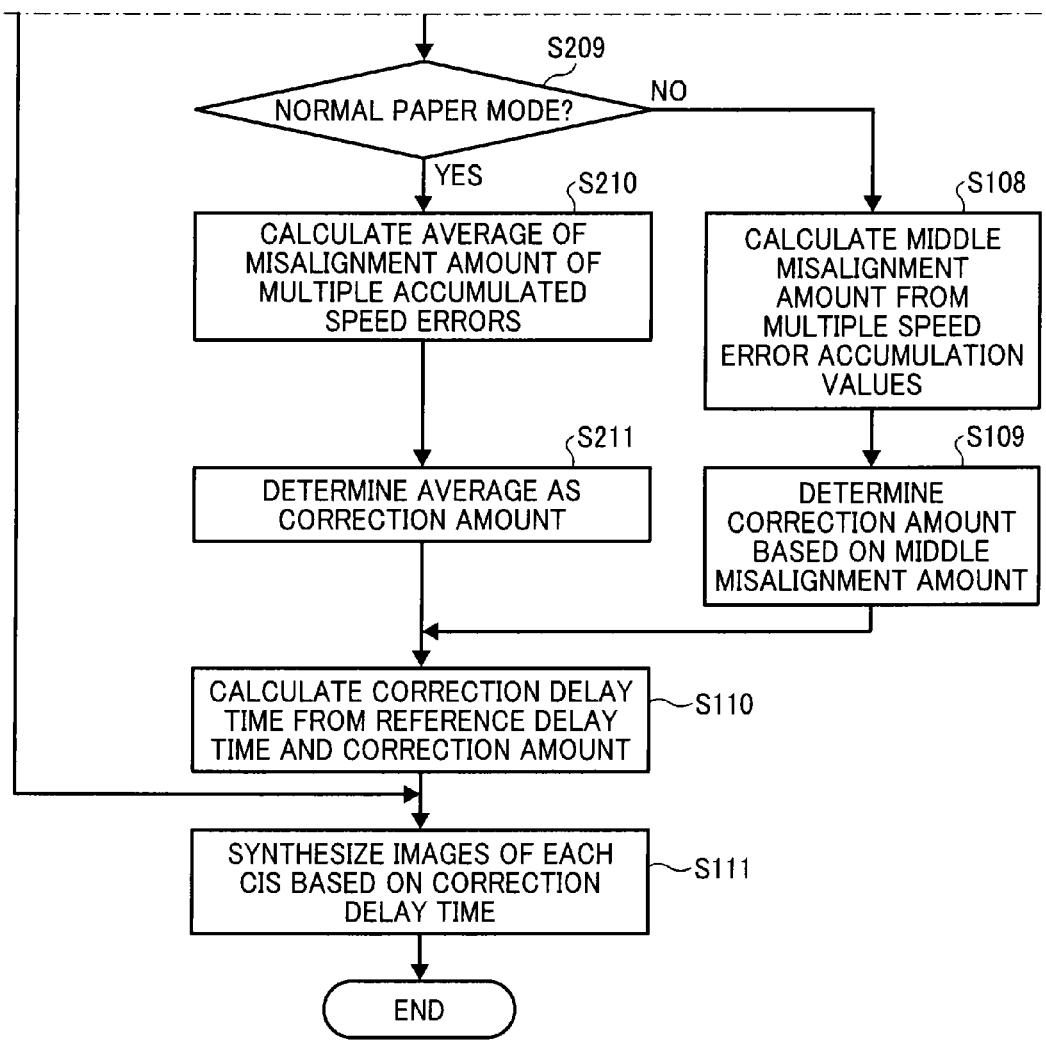

FIG. 9 and FIG. 10 are illustrations for the second embodiment of the present disclosure.

The same image reader 1 as that of the first embodiment is applied to the second embodiment and the reference numerals in the first Embodiment are used as they are.

In this embodiment, there are multiple correction modes for alignment in the sub-scanning direction. Users can suitably select one of the modes with regard to the type of the original to be read to make an appropriate alignment in the sub-scanning direction.

As described above, shock jitter is vibration caused by physical contact or separation. Thick paper is thick as its name shows and tends to have a significant strength. When such thick paper is used and contacts or separates with rollers, etc., the shock increases, resulting in an increase of vibration. Therefore, the first embodiment is effective particularly when thick paper is used. In addition, if the original G is thin, shock jitter is not great even if it happens. If the transport speed of the original is constantly and significantly different from the reference speed in such a case, the image output may be as illustrated in FIG. 6. That is, if there is a constant transport speed error d without shock jitter, the position of the image read by the CIS 22b and CIS 22d on the downstream side is distant with a gap of d×D (second) from the position of the image read by the CIS 22a, CIS 22c, and CIS 22e on the upstream side at a certain point of time. Meaning, the misalignment amount e is equal to d×D. The misalignment amount e is constant and is not corrected by the correction made by the first embodiment.

In the image reader 1, for example, "Normal paper mode" and "Thick paper mode" can be selected as correction modes in the sub-scanning direction from the operation display 33. For example, "Normal paper mode" and "Thick paper mode" can be selected depending on the type of the original and the CPU 31 makes alignment in the sub-scanning direction according to the selected mode at the operation display 33 using the image correction unit 44 for alignment in the sub-scanning direction.

In this embodiment, the correction mode is described for selection of the type of the original but the present invention is not limited to the mode based on the type of the original. The correction mode can be set to deal with different cases related to the original transfer speed error and the required image quality.

"Normal mode" is a mode for calculating the correction delay time tx using a correction amount Ma. The correction amount Ma is obtained as an average E$\alpha$, which is calculated from the accumulated data of the speed error between the original transfer reference speed v obtained by calculation from accumulated multiple speed error values in the sub-scanning direction with the speed error accumulation calculator 52 of the correction amount calculator 53 and the actual original transfer speed V detected by the speed sensor 23.

"Thick paper mode" is a mode for calculating the correction delay time tx by obtaining the correction amount M from the intermediate value Emid of the maximum misalignment amount Emax and the minimum misalignment amount Emin described in the first Embodiment.

The image reader 1 calculates the average E$\alpha$ of the misalignment amounts e1 to e5 in "normal mode" by the correction amount calculator 53 and corrects the reference delay time D by the correction delay time tx corresponding to the correction amount M determined as the average E$\alpha$ using the relationship 4.

The image reader 1 of this embodiment changes the calculation method of the correction amount M for the correction at the alignment position in the sub-scanning direction according to the selection of the alignment correction mode in the sub-scanning direction (hereinafter occasionally referred to as the type mode) to make alignment in the sub-scanning direction.

FIG. 10 is a flowchart of the second embodiment.

The same symbols and the numbers are used as in the flowchart for the first embodiment without any further description as long as they are the same.

In the second embodiment, there is a mode selection for type of paper (step S201).

As in the first embodiment, the steps S102 to S107 are processed to calculate multiple accumulated speed errors.

The CPU 31 obtains the mode selected for paper type at the operation display 33 and sends it to the correction amount calculator 53 of the image correction unit 44 at synthesized point in the sub-scanning direction. The correction amount calculator 53 determines whether the mode is "Thick paper mode" or "Normal paper mode" (Step S209).

When "Thick paper mode" is selected in the step S209, the correction delay time ta is calculated as in the steps S108 to S110 in the first embodiment and output to the correction unit 54.

When "Normal paper mode" is selected in the step S209, the correction amount calculator 53 calculates the average E$\alpha$ of the n accumulated speed errors calculated by the speed error accumulation calculator 52 (step S 210) and determines the average E$\alpha$ as the correction amount M (step S211).

The delay time ta after correction obtained by correcting the reference delay time D with the correction delay time tx corresponding to the correction amount M is calculated and output to the correction unit 54 (step S110).

The correction unit 54 makes correction for alignment in the sub-scanning direction as in the step S108 of the first embodiment.

As described above, the image reader 1 of this embodiment changes the selection of the correction mode depending on the reading conditions such as whether the type is vulnerable to shock jitter considering the characteristics of shock jitter to adjust misalignment by the method suitable for the type, etc. so that the image quality can be improved while improving the availability of the image reader 1.

Figure 11:
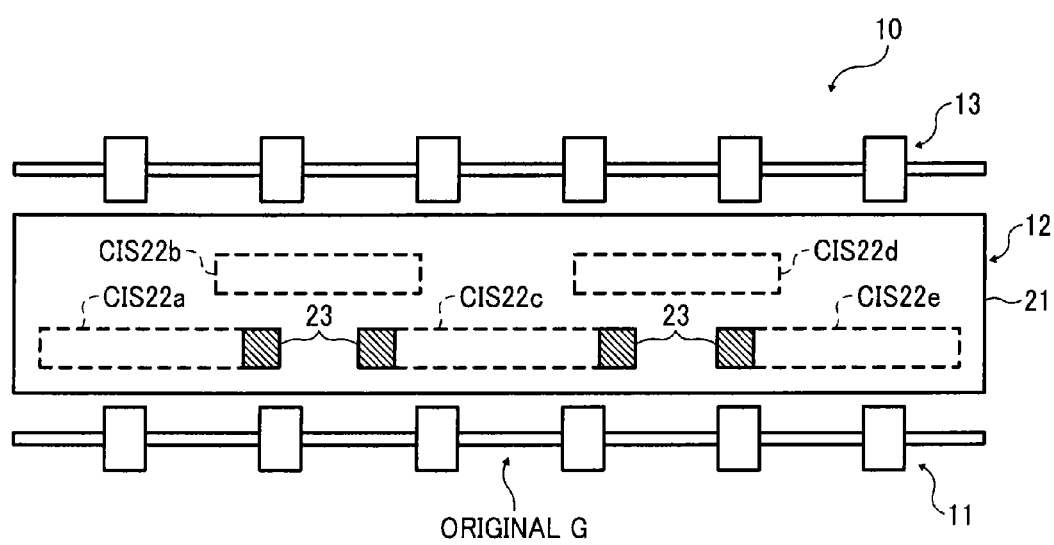
FIG. 11 is a top view illustrating the image reading portion in which the positions and the number of the speed sensors are changed.

In the first Embodiment and the second Embodiment, the speed sensor 23 is provided only around the end of the CIS 22a closer to the CIS 22c However, the number and the arrangement of the speed sensor 23 are not limited thereto. For example, as illustrated in FIG. 11, the speed meters can be provided around the ends of the CIS 22*a*, CIS 22*c*, and CIS 22*e* on the upstream side closer to the adjacent CISs.

The image correction unit 44 for alignment in the sub-scanning direction obtains the misalignment at each alignment position where the speed sensor 23 is provided as described above based on the respective detection results by the speed sensor 23 and calculates the reading delay amount at corresponding memories 24*a* to 24*e* based on the misalignment at each alignment position to correct the misalignment at each alignment position.

To be specific, steps s102 to S111 of the first embodiment are processed in parallel for each sensor.

The delay time of CIS 22*a* is determined based on the sensor 23 arranged on the CIS 22*a* and the delay time of CIS 22*e* is determined based on the sensor 23 arranged on the CIS 22*e*.

Since CIS 22*c* has the sensors 23 on its both sides, the delay time is determined by the average of the delay times obtained from the sensors 23 on the both sides.

Therefore, the variation of the original transfer speed in the main scanning direction can be detected so that a more accurate delay time can be obtained by each of the CIS 22*a*, CIS 22*c*, and CIS 22*e* on the upstream side arranged in the main scanning direction.

As described above, if the image reader 1 described above is applied to an image forming apparatus such as a photocopier and a multi-functional machine employing electrophotography or an inkjet system, the image forming unit therein produces images without recognizable misalignment in the sub-scanning direction.

The invention has been described using five sensors, although the invention may be implemented using fewer than five sensors (e.g., two, three, or four sensors) or more than five sensors (e.g., six, seven, eight . . . sensors).

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, DVDs, and magneto-optical disks, ROMs, RAMs, EPROMs, EEPROMs, flash memory, magnetic or optical cards, or any type of media suitable for storing electronic instructions.

This document claims priority and contains subject matter related to Japanese Patent Applications Nos. 2010-119933 and 2011-110972, filed on May 25, 2010 and May 18, 2011 the entire contents of which are hereby incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image reader comprising:
an original transport device to transport an original;
an image reading device including multiple image sensor arrays sensing discrete ranges and staggered on an upstream side and a downstream side relative to a transport direction of the original in such a manner that the multiple image sensor arrays are mutually offset at least partially in a main scanning direction of the original with a predetermined gap between adjacent sensors in the transport direction while adjacent image sensor arrays overlap by a predetermined amount;
at least one original transport speed detector to detect a transport speed of the original transported by the original transport device;
a storing device to store a reference delay time period extending from when the image sensor arrays on the upstream side read a predetermined position relative to the transport direction to when the image sensor arrays on the downstream side read the same predetermined position;
a misalignment amount calculator to calculate a misalignment amount between a position in the original relative to the transport direction read by the image sensor arrays on the upstream side at a given time and a position of the original relative to the transport direction read by the image sensor arrays on the downstream side in the reference delay time period after the given time based on a transport speed output by the original transport speed detector during the reference delay time period after the given time and a predetermined original reference transport speed while the original is being transported, the misalignment amount calculator determining a maximum misalignment amount, a minimum misalignment amount, and an average of multiple misalignment amounts from at least three samples of the transport speed output by the original speed detector;
a selector to select either to synthesize an image based on a middle of the misalignment amount and the arranged distance or to synthesize an image based on the average of multiple misalignment amounts and the arranged distance; and
an image synthesizer to synthesize an image read by the image sensor arrays on the upstream side and an image read by the image sensor arrays on the downstream side using one of the middle of the maximum misalignment amount and the minimum misalignment amount, and the average of multiple misalignment amounts calculated by the misalignment amount calculator in accordance with a selection made by the selector.

2. The image reader according to claim 1, wherein the original transport speed detector is provided around at least one end of adjacent image sensor arrays provided on the upstream side and the downstream side.

3. The image reader according to claim 1, wherein multiple original transport speed detectors are provided around overlapping adjacent ends of the image sensor arrays on the upstream side,
the misalignment amount calculator calculates the misalignment amount at all overlapping adjacent ends based on readings from the multiple transport speed detectors, and the image synthesizer synthesizes the image read on the upstream side and the image read on the downstream side for all of the overlapping adjacent ends.

4. An image forming apparatus comprising:
the image reader of claim 1; and an image forming unit to form an image of an original on a recording medium based on image data read by the image reader.

5. The image reader according to claim 1, wherein the selector selects either to synthesize an image based on the middle of the misalignment amount and the arranged distance or to synthesize an image based on the average of multiple misalignment amounts and based on a correction mode selected by a user.

6. An image reader comprising:

an original transport device to transport an original;

an image reading device including multiple image sensor arrays sensing discrete ranges and staggered on an upstream side and a downstream side relative to a transport direction of the original in such a manner that the multiple image sensor arrays are mutually offset at least partially in a main scanning direction of the original with a predetermined gap between adjacent sensors in the transport direction while adjacent image sensor arrays overlap by a predetermined amount;

at least one original transport speed detector to detect a transport speed of the original transported by the original transport device;

a storing device to store a reference delay time period extending from when the image sensor arrays on the upstream side read a predetermined position relative to the transport direction to when the image sensor arrays on the downstream side read the same predetermined position;

a misalignment amount calculator to calculate a misalignment amount between a position in the original relative to the transport direction read by the image sensor arrays on the upstream side at a given time and a position of the original relative to the transport direction read by the image sensor arrays on the downstream side in the reference delay time period after the given time based on a transport speed output by the original transport speed detector during the reference delay time period after the given time and a predetermined original reference transport speed while the original is being transported, the misalignment amount calculator determining a maximum misalignment amount and a minimum misalignment amount from at least three samples of the transport speed output by the original speed detector; and an image synthesizer to synthesize an image read by the image sensor arrays on the upstream side and an image read by the image sensor arrays on the downstream side using a middle of the maximum misalignment amount and the minimum misalignment amount calculated by the misalignment amount calculator, wherein;

multiple original transport speed detectors are provided around overlapping adjacent ends of the image sensor arrays on the upstream side, the misalignment amount calculator calculates the misalignment amount at all overlapping adjacent ends based on readings from the multiple transport speed detectors, and the image synthesizer synthesizes the image read on the upstream side and the image read on the downstream side for all of the overlapping adjacent ends.

* * * * *